United States Patent
Goetz

(10) Patent No.: US 11,137,087 B1
(45) Date of Patent: Oct. 5, 2021

(54) WATER LEVEL CONTROL DEVICE FOR DRAINING RAIN WATER FROM A POOL INSTALLATION

(71) Applicant: Matthew Goetz, Pompano Beach, FL (US)

(72) Inventor: Matthew Goetz, Pompano Beach, FL (US)

( * ) Notice: Subject to any disclaimer, the term of this patent is extended or adjusted under 35 U.S.C. 154(b) by 101 days.

(21) Appl. No.: 16/742,088

(22) Filed: Jan. 14, 2020

Related U.S. Application Data

(60) Provisional application No. 62/792,607, filed on Jan. 15, 2019.

(51) Int. Cl.
| | |
|---|---|
| *F16K 31/24* | (2006.01) |
| *F16K 31/18* | (2006.01) |
| *F16K 31/20* | (2006.01) |
| *F16K 31/26* | (2006.01) |
| *E04H 4/12* | (2006.01) |

(52) U.S. Cl.
CPC .............. *F16K 31/24* (2013.01); *F16K 31/18* (2013.01); *F16K 31/20* (2013.01); *F16K 31/265* (2013.01); *E04H 4/1218* (2013.01); *Y10T 137/7485* (2015.04)

(58) Field of Classification Search
CPC .......... F16K 31/20; F16K 31/18; F16K 33/00; F16K 31/24; E04H 4/1236; E04H 4/1245; E04H 4/12
USPC ....................................................... 210/127
See application file for complete search history.

(56) References Cited

U.S. PATENT DOCUMENTS

| | | | | |
|---|---|---|---|---|
| 136,296 | A * | 2/1873 | Wright ................... | E03F 5/042 137/247.19 |
| 199,238 | A * | 1/1878 | Torney et al. .......... | F02M 1/00 137/409 |
| 371,085 | A * | 10/1887 | McGary ................ | F16K 31/265 137/445 |
| 433,435 | A * | 8/1890 | Beal ....................... | F16K 31/24 137/448 |
| 529,243 | A * | 11/1894 | Buick .................... | F16K 31/26 137/426 |
| 755,000 | A * | 3/1904 | Hedberg ................ | F16K 31/24 137/448 |
| 810,390 | A * | 1/1906 | Bode ...................... | F16K 31/24 137/448 |
| 836,604 | A * | 11/1906 | Pinkerton .............. | F16K 31/24 137/448 |

(Continued)

FOREIGN PATENT DOCUMENTS

DE 202012100958 U1 * 6/2013 ............. F16K 31/22

*Primary Examiner* — Umashankar Venkatesan
(74) *Attorney, Agent, or Firm* — John Rizvi; Jolin Rizvi. P.A.—The Patent Professor®

(57) ABSTRACT

A water level control system and device is provided which maintains a desired running level of water in a surge tank connected to a pool or other body of water by facilitating automatic drainage of precipitation water from the body of water. The water level control system includes a water level control device configured to open and close a drain in the surge tank. The water level control device can adopt an open position when water in the surge tank is at a first level slightly above the running level, and a closed position in the presence of surge water or water displaced by bathers causing a rapid water rise in the surge tank above first level.

20 Claims, 5 Drawing Sheets

(56) References Cited

U.S. PATENT DOCUMENTS

| | | | | |
|---|---|---|---|---|
| 1,205,199 A | * | 11/1916 | Healy | E03F 7/04 |
| | | | | 137/448 |
| 1,354,879 A | * | 10/1920 | Boland | F16K 15/03 |
| | | | | 210/123 |
| 1,612,195 A | * | 12/1926 | Roberto | E03F 5/042 |
| | | | | 137/445 |
| 1,616,875 A | * | 2/1927 | Scheibeler | F16K 31/24 |
| | | | | 137/446 |
| 1,765,078 A | * | 6/1930 | Albert | E03F 7/04 |
| | | | | 137/445 |
| 1,800,378 A | | 4/1931 | Everson | |
| 1,864,443 A | * | 6/1932 | Albert | E03F 7/04 |
| | | | | 137/445 |
| 2,062,423 A | * | 12/1936 | Mingus | E03F 5/042 |
| | | | | 137/448 |
| 2,212,303 A | * | 8/1940 | Ruskamp | F16K 31/24 |
| | | | | 137/445 |
| 2,290,461 A | * | 7/1942 | Young | F16K 31/24 |
| | | | | 137/399 |
| 2,354,693 A | * | 8/1944 | William | F16K 31/24 |
| | | | | 137/428 |
| 2,517,195 A | * | 8/1950 | Gaspar | E03F 5/042 |
| | | | | 210/119 |
| 2,809,752 A | * | 10/1957 | Leslie | E04H 4/12 |
| | | | | 210/127 |
| 2,844,163 A | * | 7/1958 | Steinberg | E03F 5/107 |
| | | | | 137/423 |
| 3,386,107 A | | 6/1968 | Whitten, Jr. | |
| 3,537,111 A | | 11/1970 | Whitte, Jr. | |
| 3,739,405 A | * | 6/1973 | Schmidt | E04H 4/12 |
| | | | | 4/508 |
| 3,895,402 A | * | 7/1975 | Page | G05D 9/12 |
| | | | | 4/508 |
| 4,173,799 A | | 11/1979 | Patterson | |
| 4,602,460 A | | 7/1986 | Langenbach | |
| 4,627,118 A | | 12/1986 | Baker | |
| 5,365,617 A | * | 11/1994 | Tarr | E04H 4/12 |
| | | | | 137/392 |
| 5,367,723 A | * | 11/1994 | Pleva | E04H 4/12 |
| | | | | 137/428 |
| 5,459,886 A | * | 10/1995 | Payne | E04H 4/1209 |
| | | | | 137/414 |
| 5,790,991 A | * | 8/1998 | Johnson | E04H 4/12 |
| | | | | 137/423 |
| 2005/0235822 A1 | * | 10/2005 | Paduano | B66B 9/04 |
| | | | | 92/86 |
| 2012/0180881 A1 | * | 7/2012 | Humphreys | F16K 33/00 |
| | | | | 137/561 R |

\* cited by examiner

WATER LEVEL CONTROL DEVICE FOR DRAINING RAIN WATER FROM A POOL INSTALLATION

CROSS-REFERENCE TO RELATED APPLICATION

This application claims the benefit of U.S. Provisional Patent Application No. 62/792,607, filed on Jan. 15, 2019, which is incorporated by reference herein in its entirety.

FIELD OF THE INVENTION

The present invention relates generally to devices for controlling the water level in bodies of water such as swimming pools, and more particularly, to a water level control device which maintains a desired running level of water in a surge tank connected to a pool or other body of water by facilitating automatic drainage of slowly rising water typically due to rain precipitation into the body of water. The present invention also relates to a pool system comprising a water level control device facilitating automatic drainage of slowly rising water typically due to rain precipitation.

BACKGROUND OF THE INVENTION

Conventional bodies of water which are designated for a particular purpose, such as swimming pools, may include a water pool which is configured for holding water and typically has a pool sidewall and a pool bottom. A surge tank may be provided in fluid communication with the pool through a main drain conduit. A return conduit may connect the surge tank to the pool. A filter and a pump may be provided in the return conduit. In normal operation, water may be drained from the pool to the surge tank through the main drain conduit and filtered and pumped from the surge tank back into the pool through the return conduit.

In addition, a gutter may be provided in the upper portion of the pool sidewall to receive overflow water typically as persons enter the water in the pool. The gutter may be connected to the surge tank through a gutter conduit. Water from the gutter can thus be drained to the surge tank via the gutter conduit and returned to the pool via the return conduit, as described heretofore.

When no persons are in the pool, the water in the surge tank may remain at a desired level often referred to as running level. In the event that persons enter the pool causing water to become displaced, the displaced water may flow from the pool through the gutter and gutter conduit into the surge tank, resulting in a rapid rise, or surge, in the level of water in the surge tank above the running level. As the person or persons exit the pool, the water may return to the pool from the surge tank through the gutter drain conduit until the level of water in the surge tank returns to the running level. In this way, the surge tank serves as a backup container which allows displaced water to be collected and eventually returned to the pool, so that the pool water level remains substantially constant (i.e. at running level) in normal usage conditions.

In the event of rainfall or other precipitation, the level of water in the pool may rise slowly. The rising water may eventually flow from the pool into the gutter, through the gutter conduit and into the surge tank, causing the level of water in the surge tank to slowly rise above the running level. This extra water needs to be drained from the surge tank such that the level of water in the surge tank returns to the running level; otherwise, the water may overflow out of the surge tank and to the surroundings of the pool. Frequent precipitation may eventually cause the rain-originated overflow water to adversely affect surrounding tiles or flooring. For example, overflow water often leaves a scum line on the tile created with body oils, bugs, and leaves, which leaves a black line on the tile that is unsightly. Furthermore, when the gutter overflows due to rain water, everything that has been collected in the gutter, such as leaves, bugs; and body grease, overflows back into the pool creating a mess on the water surface as well as water logged debris dropping to the bottom of the pool.

In the event that the level of water in the surge tank rises significantly above the running level, such as may occur if the pump is switched off due to a power outage, for example, the water may eventually fill the surge tank. Accordingly, for safety purposes, a static overflow conduit may be provided in the surge tank in order to drain the overflow water into a French drain or other type of drain.

If, instead, the level of water in the surge tank falls below the running level, such as may occur due to a leak or evaporation, an autofill valve which may include a float switch may detect the decrease in the water level inside the surge tank and may switch to an open position, feeding external water into the surge tank such that the level of water in the surge tank rises and returns to the running level.

Normal operation of pools as described above could benefit from a solution to the problem of rain water overflow soiling, deteriorating or damaging the tiles or flooring surrounding the pool. In other words, there remains a need for a water level control system and method which maintains a desired running level of water in a surge tank connected to a pool or other body of water by facilitating automatic drainage of slowly rising water typically due to rain precipitation falling into the body of water.

SUMMARY OF THE INVENTION

The present invention is directed to a water level control system which maintains a desired running level of water in a surge tank connected to a pool or other body of water by facilitating automatic drainage of precipitation water from the body of water. The water level control system includes a water level control device configured to open and close a drain in the surge tank. The water level control device can adopt an open position when water in the surge tank is at a first level slightly above the running level, and a closed position in the presence of surge water or water displaced by bathers causing a rapid water rise in the surge tank above first level.

A further object of the present invention consists in a water level control device which maintains a desired running level of water in a surge tank connected to a pool or other body of water by facilitating automatic drainage of slowly rising water typically due to precipitation from the body of water. An illustrative embodiment of the water level control device may include a device body which may be configured to mount on a drain conduit connected to a drain. A lever arm may be pivotally attached to the device body. A float and a closure flap may be provided on the lever arm. In an open position of the device, the closure flap may disengage the device body to permit flow of water from the surge tank through the device body and drain conduit to the drain. In a closed position of the device, the closure flap may engage and seal the device body to prevent flow of water to the drain. Accordingly, under conditions in which the level of water in the surge tank slowly rises, such as in the event of precipitation, the device remains in the open position to facilitate flow of the water to the drain and maintain the water level at a desired running level. In the event that the level of water in the surge tank rapidly rises above the running level, the device may close to prevent flow of water from the surge tank to the drain. The static overflow conduit may prevent overflow of the surge tank until the pump returns the level of the water to the running level.

In a first implementation of the invention, a water level control system comprises a water level control device configured to open and close a drain configured to drain water out of a surge tank that is in fluid communication with a water body of a water system. The water level control device is configured to adopt an open position and a closed position. In the open position, the water level control device allows water from the surge tank to enter the drain when water level in the surge tank is lower than or at a first level slightly above a running level of the surge tank. In the closed position, the water level control device prevents water from the surge tank from entering the drain when water level in the surge tank rises above the first level due to water displaced by bathers in the water body causing a rapid water rise in the surge tank.

In a second aspect, the water level control device may be configured to open and close a drain opening arranged above the running level. The water level control device may be configured to be in the open position when water in the surge tank is at the running level.

In another aspect, the water level control device may be mounted on the drain.

In another aspect, the water level control device may include a device body integrally-formed with the drain.

In another aspect, the water level control device may include a device body and a movable closure flap. The closure flap may be arranged in a first position allowing fluid access to a drain opening of the drain when the water level control device is in the open position. In turn, the closure flap may be arranged in a closed position closing the drain opening when the water level control device is in the closed position.

In yet another aspect, the device body may be mounted on the drain.

In another aspect, the device body may be mounted at the running level.

In another aspect, the drain opening may be arranged above the running level. The water level control device may be configured to be in the open position when water in the surge tank is at the running level.

In another aspect, the water level control system can further include a static overflow drain opening at or near a top of the surge tank and configured to drain overflow water in the surge tank to prevent the surge tank from overflowing. The water level control device may be configured to remain in the closed position as water level rises from the first level to the static overflow drain opening.

In yet another aspect, the water level control system may further include an autofill valve configured to detect a surge tank water level decrease below the running level and responsively enable water feeding into the surge tank.

In another aspect, the water level control device may include at least one sensor configured to detect the water level inside the surge tank and responsively switch the water level control device between the open and closed positions.

In another aspect, the water level control system may further include the drain, which comprises a drain opening for receiving water from the surge tank. The drain opening may be arranged above the running level. The water level control device may be configured to be in the open position when water in the surge tank is at the running level.

In another aspect, the water level control device may include a device body configured to mount on the drain, and a lever arm pivotably carried by the device body and pivotable relative to the device body about a rotation axis. The water control device may further include a float provided on the lever arm on a first side of the rotation axis, and a closure flap provided on the lever arm on a second side of the rotation axis generally opposite to the first side. The water level control device may be configured to adopt the open position by a pivoting of the lever arm in a first direction, and may be configured to adopt the closed position by a pivoting of the lever arm in a second direction opposite to the first direction. When the water level control device is arranged in the closed position, the float may be arranged higher than in the open position and the closure flap may be arranged lower and closer to the device body than in the open position.

In yet another aspect, the water level control system ay further include the surge tank.

In another aspect, the water level control system may further include a structure configured to contain the water body.

In another aspect, the structure may include a pool.

In another aspect, the water level control system may further include the surge tank.

In yet another aspect, the water level control system may further include a gutter configured to collect overflow water from the water body. The gutter is in fluid communication with the surge tank.

In another implementation of the invention, a water level control device comprises a device body configured to mount on a fluid drainage conduit, and a lever arm pivotably carried by the device body and pivotable relative to the device body about a rotation axis. The water level control device further includes a float provided on the lever arm on a first side of the rotation axis, and a closure flap provided on the lever arm on a second side of the rotation axis generally opposite to the first side. The water level control device is configured to adopt an open position and a closed position. In the open position, the lever arm is pivoted in a first direction. In the closed position, the lever arm is pivoted in a second direction opposite to the first direction, and the float is arranged higher than in the open position and the closure flap is arranged lower and closer to the device body than in the open position.

In a second aspect, the float may include a bottom section configured to be submerged in water. The water level control device may be configured such that the bottom section and device body are located at a same height when the device body is mounted onto the fluid drainage conduit and is in the open position.

In another aspect, the water level control device may be configured to begin moving from the open position towards the closed position when a water level of a water body contacting the float starts rising above the device body.

In another aspect, the closure flap may rest on a top edge of the device body when the water level control device is in the closed position.

In another aspect, the device body may include a sleeve-shaped portion configured to fit around and onto the fluid drainage conduit.

In yet another aspect, the sleeve-shaped portion of the device body may be cylindrical.

In another aspect, the sleeve-shaped portion of the device body may be formed as a split sleeve.

In another aspect, a pair of flanges may extend from opposite ends of the split sleeve and may be configured for the attachment thereto of a fastener for tightening the split sleeve onto a fluid drainage conduit fitted therethrough.

In another aspect, the water level control device may further include a lever mount arm extending from the device body, wherein the lever arm is pivotally attached to the lever mount arm.

In yet another aspect, the level mount arm may extend upward of the device body.

In another aspect, the lever mount arm may include a pair of elongated spaced-apart arm flanges extending from the device body. The lever arm may be pivotally mounted to and between the arm flanges.

In another aspect, the lever arm may include a float end carrying the float, a flap end carrying the closure flap, and a fulcrum located between the float end and the flap end and pivotally attached to the lever mount arm.

In another aspect, the water level control device may further include an elongated float mount arm extending from the float end of the lever arm. The float may be provided on the float mount arm.

In yet another aspect, the float may be non-movable along the float arm.

In another aspect, a position of the float along the float arm may be adjustable.

In another aspect, the float arm and float may be friction-fitted to one another. A friction between the float and the float arm may be configured to be manually overcome to manually slide the float along the float arm. The friction may be further configured to not be overcome by forces resulting from rotation of pivoting of the lever arm when switching water level control device between the open and closed positions, so that the float does not slide along the arm during operation (opening and closing) of the water level control device.

In another aspect, a longitudinal axis of the float mount arm may be oriented at an angle greater than 180 degrees with respect to a plane of the closure flap.

In yet another aspect, the closure flap may be disc-shaped.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical"; "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a water level control device which maintains a desired running level of water in a surge tank connected to a pool or other body of water by facilitating automatic drainage of slowly rising water typically due to precipitation from the body of water.

Figure 5:
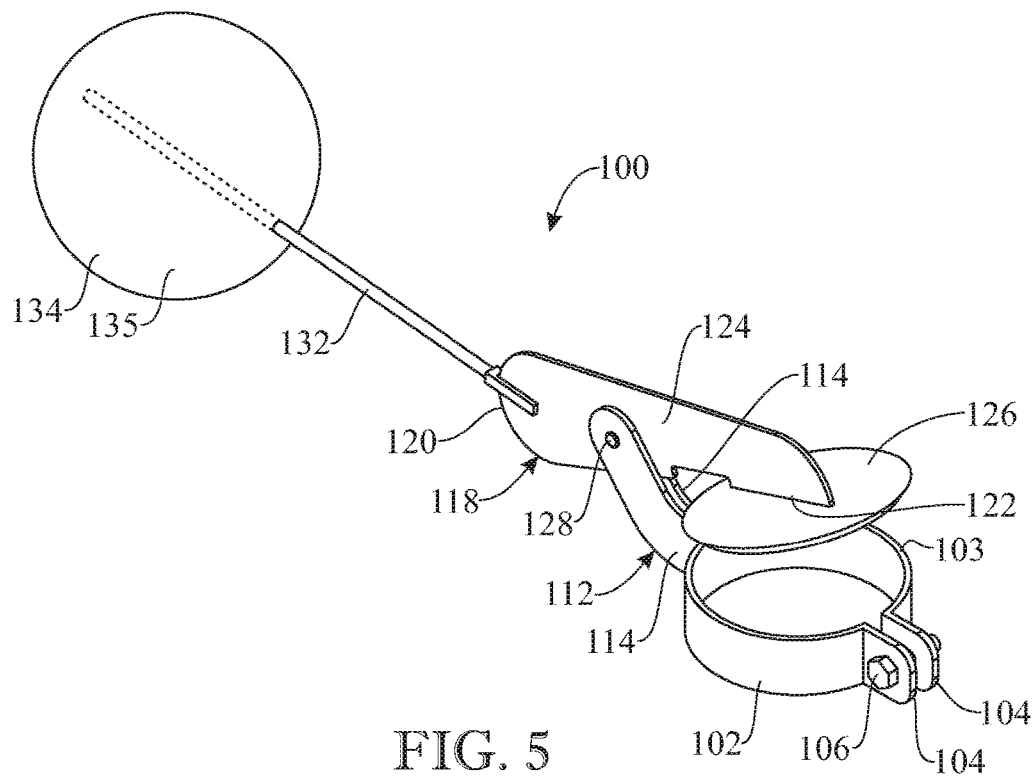
FIG. 5 presents a perspective view of the water level control device of FIG. 1 in the open position.
Figure 6:
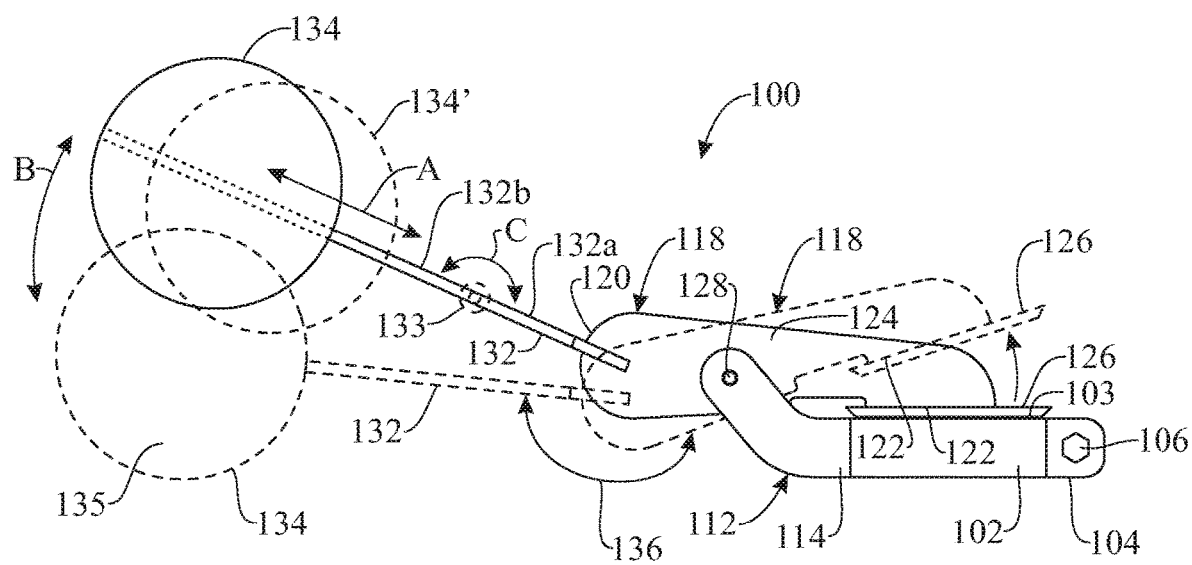
FIG. 6 presents a side view of the water level control device of FIG. 5 in the closed position (in solid lines) and the open position (in broken lines).

Referring initially to FIGS. 5 and 6, a water level control device 100 is illustrated in accordance with an exemplary embodiment of the present invention. The water level control device 100 may include a device body 102. In some embodiments, as shown, the device body 102 may be configured to attach to a drain (not shown); alternatively; the device body 102 can be a drain or water tubing configured to drain water (i.e. the device body 102 may be integrated in a drain or water tubing). The device body 102 may be sleeve-shaped, and preferably; cylindrical. As shown, the device body 102 may be formed as a split sleeve, such as a split cylindrical collar, and may include a pair of parallel, spaced-apart device body flanges 104; the body 102 may be slightly flexible such that the spaced-apart device body flanges 104 can be brought closer to each other or attached to each other in order to compress the device body 102 against a drain or water tubing. A device body fastener 106; typically secured with a nut (not illustrated), may extend through registering fastener openings (not illustrated) in the device body flanges 104 for purposes which will be hereinafter described.

A lever mount arm 112 may extend from the device body 102. The lever mount arm 112 may be elongated, and curved or angled. In some embodiments, the lever mount arm 112 may include a pair of parallel, spaced-apart arm flanges 114. The arm flanges 114 may be preferably non-movably attached to the device body 102 using mechanical fasteners, brackets, welding and/or other suitable technique or may be fabricated in one piece with the device body 102 according to the knowledge of those skilled in the art.

A lever arm 118 may be pivotally attached to the lever mount arm 112. The lever atm 118 may be elongated with a distal or float end 120, a proximal or flap end 122 and a fulcrum 124 between the float end 120 and the flap end 122. In some embodiments, the flap end 122 of the lever arm 118 may have an elongated flat edge which may be parallel to a longitudinal axis of the lever arm 118. In some embodiments, the lever arm 118 may insert between the spaced-apart arm flanges 114 of the lever mount arm 112. A pivot pin 128 may extend through aligned pin openings (not illustrated) in the arm flanges 114 and through a registering pin opening (not illustrated) in the fulcrum 124 of the lever arm 118 to pivotally mount the lever arm 118 on the lever mount arm 112.

Figure 2:
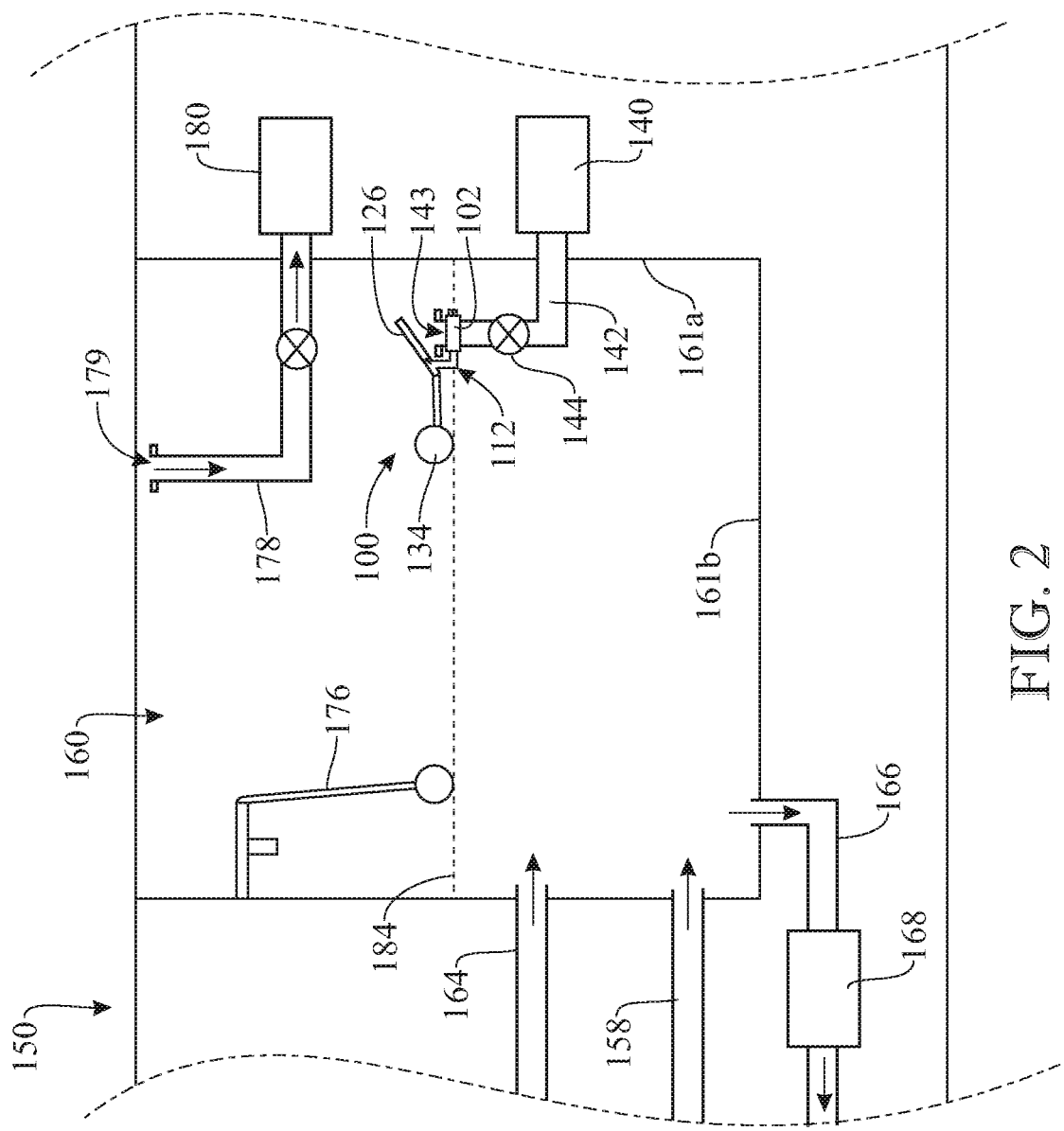
FIG. 2 presents a close-up schematic view of the surge tank and water level control device of FIG. 1 in the open position at the running level of the water in the surge tank.

The closure flap 126 may be disc-shaped and attached to or integrally formed with the flap end 122 of the lever arm 118. The closure flap 126 may be sized and configured to engage a drain or water tubing, to which the device body 102 can be attached or which can be provided by the device body in different embodiments of the invention, in a fluid-tight seal in the closed position of the water level control device 100. For instance, in the present embodiment, as shown in FIG. 6, the closure flap 126 is configured to pivotally adopt a closed position in which the closure flap 126 is arranged at or rests on a top edge 103 of the device body 102. The closure flap 126 in the closed position may close a top opening of a drain or water tubing arranged extending through the device body 102, with the top opening of the drain or water tubing at or near the top edge 103 of the device body 102 (see, for instance, FIG. 2, showing a drain opening 143 arranged slightly above the device body 102). In turn, as shown in FIG. 5, the closure flap 126 can also pivotally adopt an open position in which the closure flap 126 is pivoted away from the top edge 103 of the device body 102 and thereby allows water to flow into the drain or water tubing for draining purposes.

An elongated float mount arm 132 may extend from the float end 120 of the lever arm 118. A buoyant float 134 may be provided on the float mount arm 132, such as at a free end of the float mount arm 132, as shown. In some embodiments, the buoyant float 134 may be fixed or non-movably provided on the float mount arm 132. For instance, the float mount arm 132 may penetrate the buoyant float 134 partially or entirely across the buoyant float 134 and may be adhered thereto. In other embodiments, the buoyant float 134 may be adjustably mounted to the float mount arm 132 to allow selecting the distance between the buoyant float 134 and the rotation axis defined by the pivot pin 128, and varying the relative vertical placement of the buoyant float 134 and the closure flap 126. For instance, the float mount arm 132 may be frictionally fitted through the buoyant float 134 with the buoyant float 134 manually slidable along float mount arm 132 as indicated by arrow A; i.e., friction between the buoyant float 134 and float mount arm 132 may be sufficiently high to prevent the buoyant float 134 from sliding along the float mount arm 132 during normal operation (opening and closing as indicated by arrow B) of the water level control device 100, and yet configured to allow a person to manually overcome the friction and slide the buoyant float 134 along the float mount arm 132 (arrow A) in order to adjust the position of the buoyant float 134. For example, the illustration of FIG. 6 shows the buoyant float 134 slid along the float mount arm 132 to a new position indicated by reference numeral 134'.

Alternatively or additionally, the position of the buoyant float 134 relative to the closure flap 126 may be adjustable by having the buoyant float 134 pivotably adjustable relative to the closure flap 126. For example, the float mount arm 132 may be divided into a first float mount arm portion or segment 132a and a second float mount arm portion or segment 132b which are connected to one another by an articulated connection 133, shown in phantom lines in FIG. 6. The first float mount arm segment 132a may be attached to the lever arm 118; the second float mount arm segment 132b, in turn, may carry the buoyant float 134. The articulated connection 133 may be configured to allow a user to adjust the angle formed between the first and second float mount arm segments 132a and 132b as indicated by arrow C, and then secure the articulated connection 133 (e.g., via a bolt comprised therein) to maintain the first and second float mount arm segments 132a and 132b at the selected angle. By adjusting the angle between the first and second float mount arm segments 132a and 132b, the relative vertical position of the buoyant float 134 and the closure flap 126 may be varied, allowing to adjust operation of the water level control device 100 to a specific or desired running level (e.g., running level 184 shown in FIGS. 1-4) and position of the drain opening 143.

As illustrated in FIG. 6, the water level control device 100 is configured so that rising of the buoyant float 134 causes a lowering of the closure flap 126 towards the closed position (shown in solid lines), and lowering of the buoyant float 134 causes the closure flap 126 to pivotally rise towards the open position (shown in phantom lines). The buoyant float 134 and closure flap 126 may be arranged approximately at opposite sides, or diametrically opposite, relative to the rotation axis between the lever arm 118 and lever mount arm 112. As shown, a bottom section 135 of the buoyant float 134 (the bottom section 135 configured to be submerged as water level rises and causes the buoyant float 134 to rise) may be located at a same height, or on a same horizontal plane, as the device body 102. Furthermore, the longitudinal axis of the float mount arm 132 may be disposed at a float angle 136 greater than 180 degrees with respect to a plane of the closure flap 126. Accordingly, in the open position of the water level control device 100, as indicated by the phantom lines in FIG. 6, the lever arm 118 may be positioned such that the float 134 is in a lower position, the bottom section 135 of the buoyant float 134 is substantially at the same height as the device body 102, and the closure flap 126 is in a raised position and disengages and unseals the drain. Conversely, in the closed position of the water level control device 100, as indicated by the solid lines in FIG. 6, the lever arm 118 may be positioned such that the float 134 is in a raised position and the closure flap 126 is in the lower position and engages and seals the drain. As can be seen, the water level control device 100 is configured to begin moving towards the closed position (i.e. begin closing) as soon as water level starts rising above the drain opening (i.e. above the device body 102).

The illustrations of FIGS. 1-4 show a water level control system in accordance with an illustrative embodiment of the invention, the water level control system including, for instance, the water level control device 100 of FIGS. 5 and 6. The water level control system is shown installed in a surge tank 160 connected to a water pool 152 configured to hold water in a swimming pool facility 150, but could be installed in other bodies of water in different applications of the invention.

The pool 152 may have a pool sidewall 154 and a pool bottom 156. Similarly, the surge tank 160 may have a surge tank sidewall 161a and a surge tank bottom 161b. The surge tank 160 may be provided in fluid communication with the pool 152 through a main drain conduit 158; in some embodiments, such as the present embodiment, the main drain conduit 158 may extend from the pool bottom 156 to the surge tank sidewall 161a. A return conduit 166 may connect the surge tank 160 to the pool 152; in some embodiments, such as the present embodiment, the return conduit 166 may extend from the surge tank bottom 161b to the pool sidewall 154. A filter 168 and a pump 170 may be provided in the return conduit 166. In normal operation of the swimming pool facility 150, water may be continually drained from the pool 152 to the surge tank 160 through the main drain conduit 158 and filtered and pumped from the surge tank 160 back into the pool 152 through the return conduit 166.

At least one gutter 162 may be provided in the upper portion of the pool sidewall 154 to receive displaced or surge water from the pool 152 typically as persons enter the water in the pool 152. The gutter 162 may be connected to the surge tank 160 through a gutter conduit 164; in some embodiments, such as the present embodiment, the gutter conduit 164 may extend from the gutter 162 to the surge tank sidewall 161a. Water from the gutter 162 may also be filtered and pumped back to the pool 152 via the return conduit 166.

Figure 1:
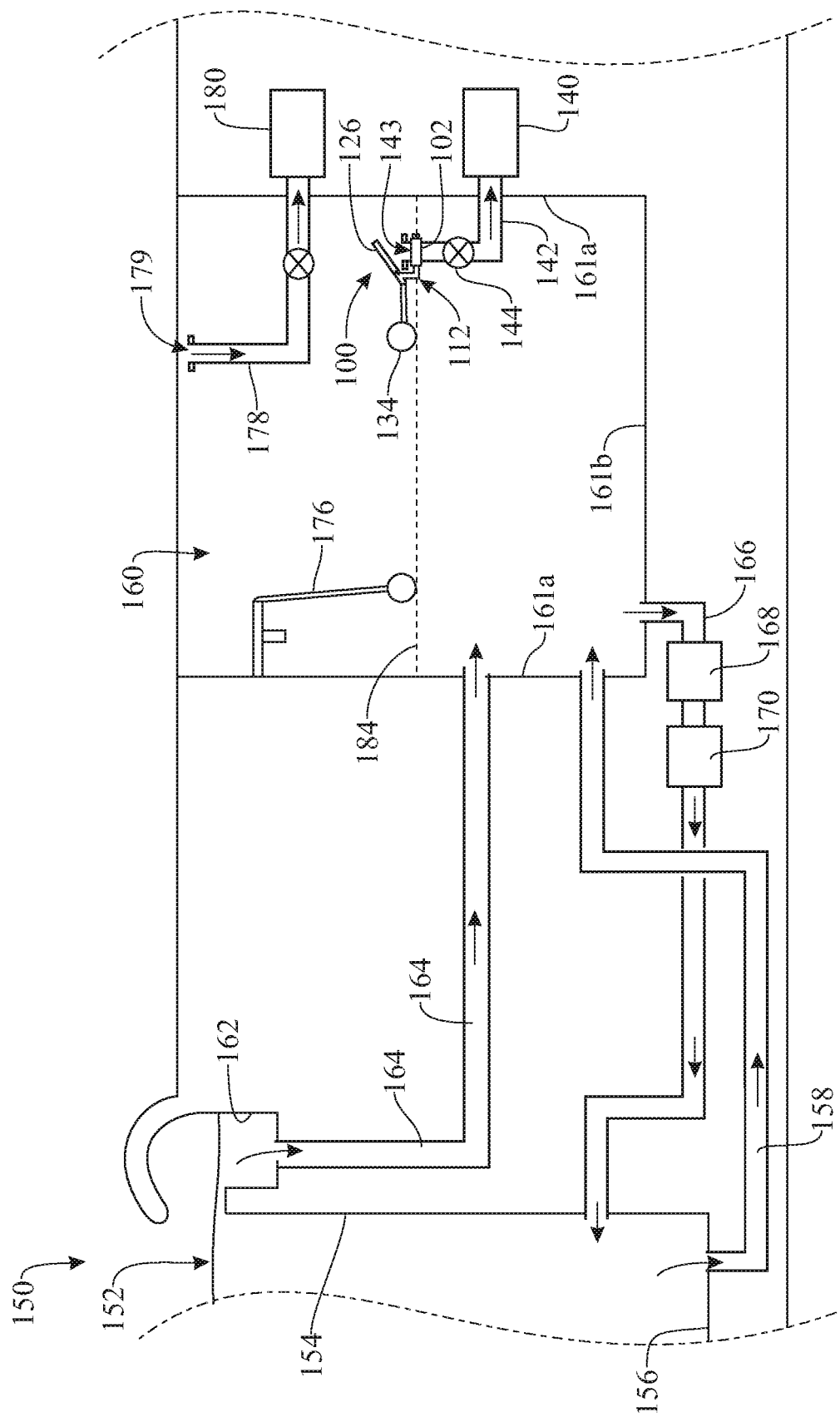
FIG. 1 presents a schematic view showing a typical swimming pool facility with a pool, a gutter in the pool and a surge tank connected to the gutter, with an illustrative embodiment of the water level control system and device of the present invention deployed in the surge tank, more particularly illustrating a typical open position of the water level control device at a running level of the water in the surge tank.

Turning now to the surge tank 160, at least one drain 140 may be provided in fluid communication with the surge tank 160 through a drain conduit 142. In some embodiments, the at least one drain 140 may include a French drain, sump pump and/or a pump pit, for instance and without limitation. As shown, the drain conduit 142 is installed through the surge tank sidewall 161a providing fluid communication between an outside of the surge tank 160 and the inside of the surge tank 160. The drain conduit 142 may be a 90-degree fitting or may present alternative shapes. A drain valve 144 may be provided in the drain conduit 142. The drain conduit 142 terminates in a drain opening 143 arranged within the surge tank 160 and configured to receive water therethrough for purposes that will be hereinafter described. The device body 102 of the water level control device 100 may be integrally-formed with the upper, vertical arm of the drain conduit 142; alternatively, the water level control device 100 may be mounted on the upper, vertical arm of the drain conduit 142 typically by attachment of the device body 102 to the drain conduit 142. In some embodiments, this may be accomplished by loosening the device body fastener 106 (FIGS. 5 and 6) in the device body flanges 104, fitting the device body 102 on the drain conduit 142 and tightening the device body fastener 106 to secure the device body 102 in fluid-tight fluid communication with the drain conduit 142. As illustrated in FIGS. 1 and 2, the drain conduit 142 and the device body 102 may be situated at a height or vertical position in the surge tank 160 such that the water level control device 100 is in the open position when the float 134 is at the desired running level 184 of the water in the surge tank 160, and the drain opening 143 is arranged slightly above the running level 184. Conversely, the water level control device 100 switches to the closed position when the float 134 rises above the running level 184. Accordingly, when the level of water in the surge tank 160 rises slightly above the running level 184, water may flow from the surge tank 160 through the device body 102 and drain conduit 142, respectively, into the drain 140. In some embodiments, as shown, the water level control device 100 is configured so that the device body 102 position matches the desired running level 184 and the drain opening 143 is arranged slightly above the device body 102. The desired running level 184 may serve as a reference when mounting the drain conduit 142 and the water level control device 100 (i.e. the device body 102) in the surge tank 160.

When no persons are in the pool 152, the water in the surge tank 160 may remain at the running level 184 as illustrated in FIG. 1. When the water in the surge tank 160 is at the running level 184, the water level control device 100 is arranged in the open position but water does not drain into the drain opening 143 and drain conduit 142 as the drain opening 143 is arranged slightly above the running level 184.

Figure 4:
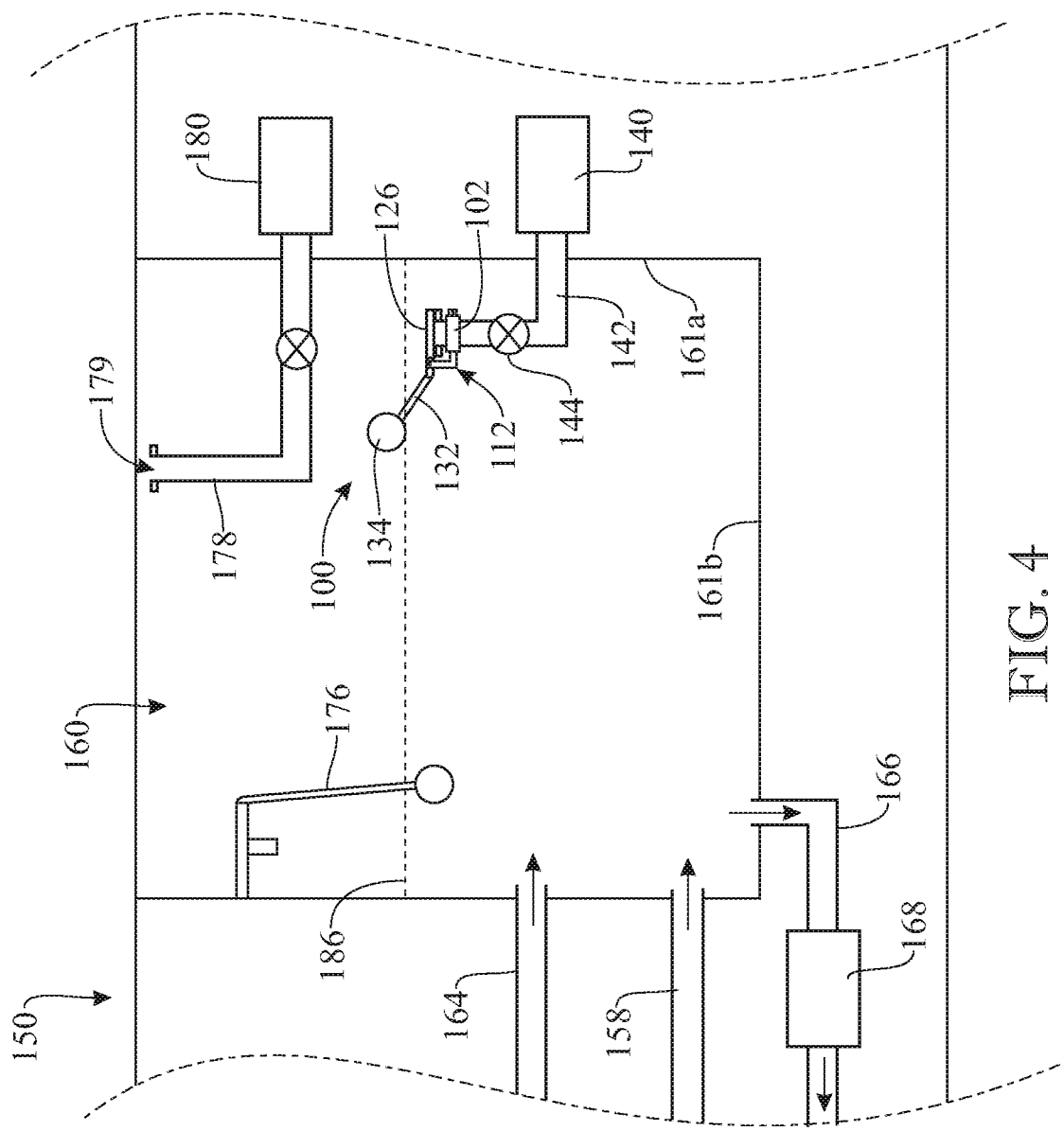
FIG. 4 presents a close-up schematic view of the surge tank and water level control device of FIG. 1 as bathers have entered the pool and surge water in the surge tank has switched the water level control device to a closed position to prevent water from being drained from the surge tank.

In the event that persons enter the pool 152, the displaced water (i.e. the water displaced by such person or persons) flows rapidly from the pool 152 through the gutter 162 and gutter conduit 164 into the surge tank 160, resulting in a rapid rise, or surge, in the water level 186 above the running level 184 in the surge tank 160, as illustrated in FIG. 4. The water rise taking place rapidly and significantly above the running level 184 causes the water level control device 100 to switch almost immediately to the closed position, as illustrated in FIG. 4. More specifically, the increased water level 186 causes the float 134 to rise and the lever mount arm 112 to consequently pivot the closure flap 126 into sealing engagement with the drain opening 143 to prevent flow of the water from the surge tank 160 through the device body 102 and drain conduit 142, respectively, into the drain 140. This allows water to remain within the system (pool 152, gutter 162 and surge tank 160) while bathers are using the pool 152, i.e. allows rapidly bather-displaced water not to be drained from the surge tank 160. As the person or persons subsequently exit the pool 152, the water may return to the pool 152 from the surge tank 160 through the gutter drain conduit (not illustrated) such that the level of water in the surge tank 160 returns to the running level 184.

Figure 3:
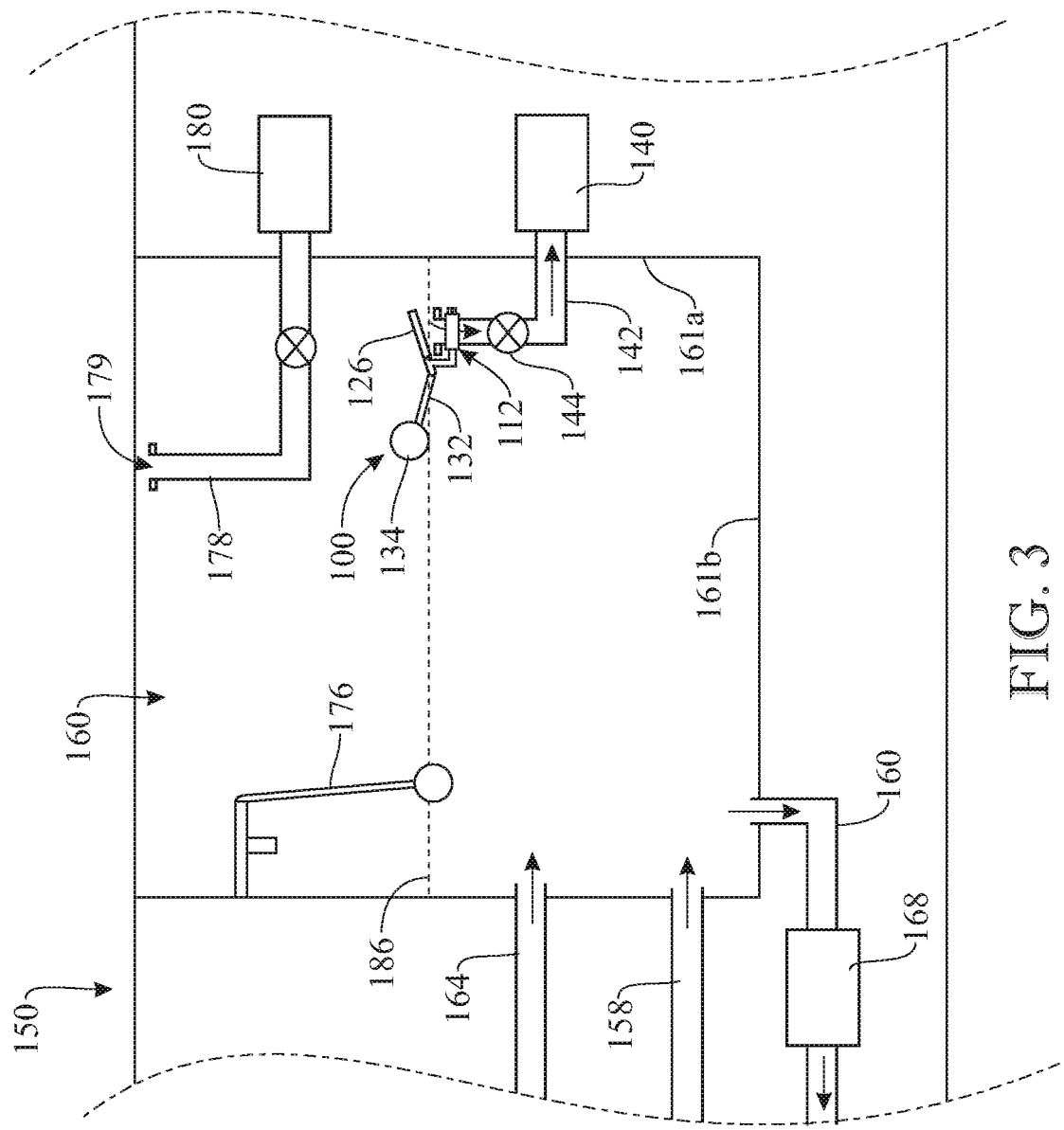
FIG. 3 presents a close-up schematic view of the surge tank and water level control device of FIG. 1 as water level slowly rises from the running level due to rain precipitation, and the water level control device remains open to allow extra water caused by rain precipitation to drain from the surge tank.

In the event of rainfall or other precipitation, the level of water in the pool 152 may instead rise slowly from the running level 184 (i.e. slower than the aforementioned bather-provoked water surge), as shown in FIG. 3. The water may thus overflow from the pool 152 into the gutter 162, and through the gutter conduit 164 into the surge tank 160, causing the level of water in the surge tank 160 to slowly rise above the running level 184. As further shown in FIG. 3, as water slowly rises above the running level 184, the water level control device 100 remains open such that the slowly rising water in the surge tank 160 caused by the precipitation is drained through the drain opening 143 and drain conduit 142 into the drain 140. The level of water in the surge tank 160 automatically remains at or near the running level 184 (FIG. 2) even in rainy weather conditions, thus preventing rain water from overflowing the gutter 162 and soiling or deteriorating the surroundings of the pool 152.

In summary, the water level control system of the present invention comprises a water level control device configured to open and close a drain, wherein the water level control device is arranged in an open position when water is lower than or at a first level slightly above the running level, and further wherein the water level control device switches to a closed position in the presence of surge water or water displaced by bathers causing the water level in the surge tank to raise to a second level which is higher than the first level.

Finally, in the event that the level of water in the surge tank 180 rises significantly above the running level 184, such as due to the pump 170 being switched off due to a power outage, the water may eventually fill the surge tank 180 almost entirely. In this situation, the float 134 will have risen in the water such that the lever mount arm 112 closes the closure flap 126 into sealing engagement with the device body 102 in the closed position of the water level control device 100. In order to prevent water from overflowing the surge tank 160 in such a situation, the surge tank 160 may include, for instance and without limitation, a static overflow drain or conduit 178 configured to drain the overflow water into a French drain 180 or other type of drain. As shown, the static overflow conduit 178 ends in a static overflow opening 179 arranged at or near the top of the surge tank 180, well above drain opening 143 and the water level control device 100 and also well above the rising water level 186 that causes the closure flap 126 to close the drain opening 143. Thus, in the event that water reaches the static overflow conduit 178, the water level control device 100 will be in the closed position, as shown in FIG. 4. This way, the static overflow drain or conduit 178 can operate normally, without interference from or by the slow-rising-water draining system provided by the water level control device 100.

If the level of water in the surge tank 160 falls below the running level 184, such as due to a leak or evaporation, for example, an autofill valve 176 which may include a float switch (not numbered) may detect the decrease in the water level and switch to an open position, feeding external water into the surge tank 160 such that the level of water in the surge tank 160 returns to the running level 184.

Alternative embodiments are contemplated to those depicted herein. For instance, the water level control system shown in FIGS. 1-4 may include an alternative water level control device 100 without departing from the scope of the present invention. For instance and without limitation, alternatively or additionally to the mechanical water level sensor described herein (i.e. the buoyant float 134), the water level control device 100 may include a magnetic float water level sensor, a conductive sensor, a capacitance sensor, etc., or combinations thereof, and an actuator valve configured to open and close the drain opening 143 as described with reference to FIGS. 1-4, responsively to the aforementioned sensor(s) detecting a water level rise slightly above the running level. More specifically, actuator valve is configured to maintain the drain opening 143 open while the sensor(s) sense the water level approximately at the running level (similarly to FIG. 2), to start closing the opening 143 as water begins to rise form the running level (similarly to FIG. 3), and to close the opening 143 completely when water has risen slightly farther from the running level (similarly to FIG. 4), to guarantee that the opening 143 is closed in the event of surge water caused by bathers.

In summary, the system and device of the present disclosure provide a surge-draining solution capable of draining rising water in the surge tank caused by rain, while not draining rapidly-rising surge water caused by bathers using the pool. The system and device therefore allow the pool to operate normally (i.e. be able to maintain the running level in presence or absence of bathers) while preventing water caused by rainfall from overflowing the surge tank. By preventing rainfall water from overflowing the surge tank, the system and device help prevent grease, debris and line marks from being left on the surrounding tiles or flooring, and also from overflowing back into the pool. Thus, the present invention significantly contributes to maintain the pool and surrounding tiles or flooring clean. Furthermore, the system and device of the present disclosure allow to more rapidly drain rain water manually, thus saving time.

Since many modifications, variations, and changes in detail can be made to the described preferred embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

What is claimed is:

1. A water level control device for a water pool comprising:
   a surge tank in fluid communication with the water pool by means of an overflow conduit;
   a device body mounted onto a fluid drainage conduit of the surge tank;
   a lever arm pivotably carried by the device body, wherein the lever arm is pivotable relative to the device body about a rotation axis;
   a float provided on the lever arm on a first side of the rotation axis; and
   a closure flap provided on the lever arm on a second side of the rotation axis generally opposite to the first side; wherein
   the water level control device is configured to adopt:
      an open position in which the lever arm is pivoted in a first direction, and
      a closed position in which the lever arm is pivoted in a second direction opposite to the first direction, and further in which the float is arranged higher than in the open position and the closure flap is arranged lower and closer to the device body than in the open position.

2. The water level control device of claim 1, wherein the float comprises a bottom section configured to be submerged in water, and the water level control device is configured such that the bottom section and device body are located at a same height when the device body is mounted onto the fluid drainage conduit and is in the open position.

3. The water level control device of claim 1, wherein water level control device is configured to begin moving from the open position towards the closed position when a water level of a water body contacting the float starts raising above the device body.

4. The water level control device of claim 1, wherein the closure flap rests on a top edge of the device body when the water level control device is in the closed position.

5. The water level control device of claim 1, wherein the device body comprises a sleeve-shaped portion configured to fit around and onto the fluid drainage conduit.

6. The water level control device of claim 5, wherein the sleeve-shaped portion of the device body is cylindrical.

7. The water level control device of claim 5, wherein the sleeve-shaped portion of the device body is formed as a split sleeve.

8. The water level control device of claim 7, wherein a pair of flanges extends from opposite ends of the split sleeve and is configured for the attachment thereto of a fastener for tightening the split sleeve onto a fluid drainage conduit fitted therethrough.

9. The water level control device of claim 1, further comprising a lever mount arm extending from the device body, wherein the lever arm is pivotally attached to the lever mount arm.

10. The water level control device of claim 9, wherein the level mount arm extends upward of the device body.

11. The water level control device of claim 9, wherein the lever mount arm comprises a pair of elongated spaced-apart arm flanges extending from the device body, wherein the lever arm is pivotally mounted to and between the arm flanges.

12. The water level control device of claim 9, wherein the lever arm comprises a float end carrying the float, a flap end carrying the closure flap, and a fulcrum located between the float end and the flap end and pivotally attached to the lever mount arm.

13. The water level control device of claim 12, further comprising an elongated float mount arm extending from the float end of the lever arm, wherein the float is provided on the float mount arm.

14. The water level control device of claim 13, wherein the float is non-movable along the float mount arm.

15. The water level control device of claim 13, wherein a position of the float relative to the closure flap is adjustable.

16. The water level control device of claim 15, wherein the float mount arm and float are friction-fitted to one another, wherein a friction between the float and the float mount arm is configured to be manually overcome to manually slide the float along the float mount arm, and wherein said friction is further configured to not be overcome by forces resulting from rotation of pivoting of the lever arm when switching water level control device between the open and closed positions.

17. The water level control device of claim 13, wherein a longitudinal axis of the float mount arm is oriented at an angle greater than 180 degrees with respect to a plane of the closure flap.

18. The water level control device of claim 1, wherein the closure flap is disc-shaped.

19. A water level control device for a water pool comprising:
   a surge tank in fluid communication with the water pool by means of an overflow conduit;
   a device body comprising a sleeve-shaped portion mounted onto a fluid drainage conduit of the surge tank;
   a lever mount arm extending from the device body;
   a lever arm pivotably mounted to the lever mount arm, wherein the lever arm is pivotable relative to the device body about a rotation axis;
   a float provided on the lever arm on a first side of the rotation axis; and
   a closure flap provided on the lever arm on a second side of the rotation axis generally opposite to the first side; wherein
   the water level control device is configured to adopt:
      an open position in which the lever arm is pivoted in a first direction, and
      a closed position in which the lever arm is pivoted in a second direction opposite to the first direction, and further in which the float is arranged higher than in the open position and the closure flap is arranged lower and closer to the device body than in the open position.

20. A water level control device for a water pool comprising:
   a surge tank in fluid communication with the water pool by means of an overflow conduit;
   a device body comprising a sleeve-shaped portion mounted onto a fluid drainage conduit of the surge tank;
   a lever mount arm extending from the device body;
   a lever arm pivotably mounted to the lever mount arm, wherein the lever arm is pivotable relative to the device body about a rotation axis;
   a float provided on the lever arm on a first side of the rotation axis; and
   a closure flap provided on the lever arm on a second side of the rotation axis generally opposite to the first side; wherein
   the water level control device is configured to adopt:
      an open position in which the lever arm is pivoted in a first direction, and
      a closed position in which the lever arm is pivoted in a second direction opposite to the first direction, and further in which the float is arranged higher than in the open position and the closure flap is arranged lower and closer to the device body than in the open position; and further wherein
   the water level control device is configured to begin moving from the open position towards the closed position when a water level of a water body contacting the float starts rising above the sleeve-shaped portion of the device body.

\* \* \* \* \*